UNITED STATES PATENT OFFICE 2,329,702

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application October 20, 1941, Serial No. 415,765

6 Claims. (Cl. 252—344)

This invention relates to the resolution of petroleum emulsions.

One object of our invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned is of significant value in removing impurities, particularly inorganic salts from pipeline oil.

The demulsifier or demulsifying agent employed in our process herein described, consists of a quaternary compound of the pyridine series of the kind hereinafter described in detail. Members of the pyridine series suitable as reactants include pyridine, alkylated derivatives of pyridine, particularly alkylated derivatives in which the alkyl radical contains three carbon atoms or less, and especially methylated pyridines, i. e., pyridines in which one, two, or three methyl groups have been substituted in the nucleus, such as picolines, lutidines and collidines. Also suitable as reactants are the comparable quinolines and isoquinolines, along with C-methyl homologues thereof. Coal tar bases represent mixtures of suitable heterocyclic materials which may be used as such, or after suitable purification, without separation into the individual components.

Specifically, then, the compounds herein contemplated as demulsifiers, consist of quaternary nitrogen products obtained by reacting one mole of hydroxy compounds of the following formula type:

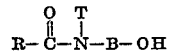

in which T is a member of the class consisting of hydroxyethyl radicals, alkyl radicals, arylradicals, aralkyl radicals, and alicyclic radicals having not more than 22 carbon atoms; RCO denotes a radical derived from a detergent-forming monocarboxy acid; and B is a divalent radical in which at least one occurrence of the ether linkage, —C—O—C—, appears with a heterocyclic compound of the pyridine series selected from the group consisting of pyridine, quinoline, isoquinoline, and C-methyl homologues thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base. In the above T may also be —B.OH.

It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

As to a description of a somewhat analogous type of compound, see U. S. Patent No. 2,242,211, dated May 20, 1941, to Haack. See also our copending application for patent Serial No. 401,375, filed July 7, 1941, which subsequently matured as U. S. Patent No. 2,273,181, dated February 17, 1942, to De Groote and Keiser.

The manufacture of substituted amides, or rather, substituted hydroxylated amides suitable for reaction with pyridine hydrochloride or the like, is well known. For instance, a selected high molal monocarboxy acid can be reacted with diethanolamine, dipropanolamine, tris(hydroxymethyl) aminomethane, octyl ethanolamine, benzyl ethanolamine, cyclohexyl ethanolamine, phenyl ethanolamine, dipropanolamine, or the like, to give a substituted amide containing at least one alcoholic hydroxyl in the substituted amino radi cal, and in some instances, more than one, as when derived from diethanolamine or a glyceryl or diglycerylamine derivative. Such amide can then be treated in the conventional manner with a suitable oxyethylating agent, such as ethylene oxide, propylene oxide, glycid, or any one of a number of other suitable reactants. As to a variety of oxyalkylating reactants or reactants intended to introduce hydroxy hydrocarbon groups, see U. S. Patent No. 2,208,501, dated July 23, 1940, to Hoeffelman. As a matter of fact, such reactants, particularly ethylene oxide, can be employed to treat the unsubstituted amide, for instance, oleoamide, ricinoleoamide, stearamide, and the like, so as to give the same carbon compound as if the derivative had been obtained from monoethanolamine. As previously stated, the oxyethylation of such compounds or similar reaction procedure involves treatment at comparatively low temperatures, for instance, 120–200° C., under pressure varying, for example, from 75 lbs. pressure to 300 lbs. pressure, and usually, in the presence of a catalyst consisting of about one half percent of an alkaline material, such as caustic soda, caustic potash, sodium methylate, or the like.

Although any of the high molal monocarboxy acids can be converted into the substituted hydroxy ethyl amides readily by reaction with monoethanolamine, or by other conventional procedure, for instance, reaction of the amide with one mole of ethylene oxide, it is our preference to employ hydroxylated amides derived from the higher fatty acids, rather than from petroleum acids, rosin acids, and the like. We have found that by far the most effective demulsifying agents are obtained from unsaturated fatty acids having 18 carbon atoms. Such unsaturated fatty acids include the fatty acids, such as oleic acid, ricinoleic acid, linoleic acid, linolenic acid, etc. One may employ mixed fatty acids, as, for example, the fatty acids obtained from hydrolysis of cottonseed oil, soyabean oil, corn oil, etc. Our preferred demulsifier is obtained from unsaturated fatty acids, and more especially, unsaturated fatty acids containing a hydroxyl radical, or unsaturated fatty acids which have been subjected to an oxidation or oxyalkylation step, such as oxyethylation.

Oxyalkylation or the equivalent reactions in essence do nothing more or less than introduce a divalent radical, generally an aliphatic radical, in which the carbon chain is interrupted at least once by oxygen. This is true, for instance, where a one pound mole of a selected amide is treated with 10 or 15 pound moles of ethylene oxide, or the like. One may introduce as many as 10 or 15 ether linkages.

In view of what has been said, and in particular, by reference to the aforementioned Haack patent, it will be noted that the compound or composition of matter intended to be used as the demulsifier of our process, may be indicated by the following formula:

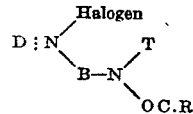

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms, or is the radical B.OH, where B has its previous significance; and hydroxyethyl radicals; and R.CO denotes a radical derived from a detergent-forming monocarboxy acid.

The above mentioned demulsifier may be exemplified by the following examples:

*Example 1*

One pound mole of the amide derived from mixed cocoanut oil is reacted with 4 pound moles of ethylene oxide to give an amide corresponding to the following formula wherein R.CO represents the acyl radical of the mixed cocoanut oil fatty acids, $RCON(C_2H_4OC_2H_4OH)_2$. One pound mole of such raw material is reacted with one pound mole of pyridine hydrochloride at approximately 150–160° C. in presence of a slight amount of pure pyridine. Reaction is continued until complete, as indicated by solubility and absence of the initial reactants. Instead of pure pyridine, a mixture of pyridine bases, for instance, 50% distilling up to 140° C., and 90% distilling at 160° C., and completely soluble in water, may be employed as a reactant. (Compare this procedure with Example 2 of the aforementioned Haack Patent No. 2,242,211.)

*Example 2*

The same comparable compound obtained from 6 moles of ethylene oxide instead of 4 moles is employed as a reactant in the same procedure as in Example 1, preceding.

*Example 3*

The substituted amide derived by reaction between cocoanut oil fatty acids of the kind described and tris(hydroxymethyl)aminomethane, is substituted in the preceding example, i. e., the example where 6 moles of ethylene oxide are reacted with one mole of an amide to give a suitable raw material. Such raw material then is employed in the same way for reaction with pyridine hydrochloride or the like.

*Example 4*

The same procedure is employed as in the preceding example, except that the amide is reacted with 9 moles of ethylene oxide instead of 6 moles, all the other procedure being identical.

*Example 5*

One mole of a substituted amide obtained by reaction between cocoanut oil fatty acids and octylamine is treated with 2 moles of ethylene oxide to give a substituted amide of the following composition:

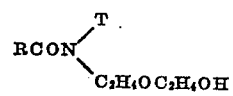

wherein RCO has its previous significance and T represents an octyl radical. Such an amine is treated in the same manner as in the preceding example, so as to obtain reaction with pyridine hydrochloride or the like.

*Example 6*

Cyclohexylamine is substituted for octylamine in the preparation of an amide, which is subsequently treated with 2 moles of ethylene oxide for each mole of amide, and then with pyridine hydrochloride or the like.

Example 7

Benzylamine is substituted for octylamine or cyclohexylamine in the two preceding examples, the rest of the procedure remaining the same.

Example 8

Phenylamine (aniline) is substituted for octylamine, cyclohexylamine, or benzylamine in the three preceding examples, with the rest of the procedure remaining the same.

Example 9

The same procedure is employed as in the four previous examples, except that instead of the substituted amide,

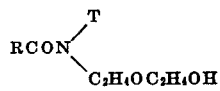

one employs an amide of the following composition:

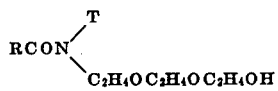

obtained by using an increased proportion of ethylene oxide.

Example 10

The amide derived from diethanolamine and having the following composition:

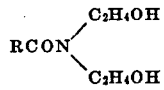

(RCO having its previous significance) is reacted with one mole of ethylene oxide for each mole of amide to give an amide of the following composition:

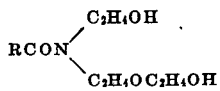

which, in turn, is reacted with pyridine hydrochloride in the manner previously described.

Example 11

Ricinoleic acid is substituted for cocoanut oil fatty acids in Examples 1–10, preceding.

Example 12

A drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 |
| Percent unsaponifiable matter | 1.1 |
| Percent nitrogen | 0.0 |
| Percent SO₃ | 0.0 |
| Percent ash | Trace | is converted into the substituted amide by reaction with tris(hydroxymethyl) aminomethane. Such amide is substituted for the amide employed in Examples 1–10, preceding.

Example 13

One pound mole of castor oil is treated with three pound moles of ethylene oxide in the presence of one-half of 1% of sodium ricinoleate as a catalyst at a temperature of 100–200° C. at a gauge pressure of 100 lbs. and less than 300 lbs., so as to produce an oxyethylated triricinolein. An amide derived from such material by reaction with tris(hydroxymethyl) aminomethane is employed instead of the amide described in Examples 1–10 preceding.

Example 14

Phenylstearic acid is prepared in any suitable manner, as, for example, in the manner described in U. S. Patent No. 2,081,075, dated May 18, 1937, to Vobach. This is converted into an amide by reaction with tris(hydroxymethyl) aminomethane, and such amide employed in the manner described in Examples 1–10, preceding.

The manufacture of the above compounds is usually conducted with an excess of the pyridinium base halide, such as the hydrochloride, or hydrobromide, and usually in the presence of a significant amount of the free pyridinium base itself. In many instances, however, there is no need to use an excess of the pyridinium base halide, and, in fact, no need to have present any of the free pyridinium base itself, or, at the most, only a trace of the free base.

As is obvious, other monovalent anions may replace the halogen and serve as a functional equivalent.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagent are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, cr conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

Attention is directed to our co-pending application for patent, Serial No. 401,375, filed July 7, 1941, which subsequently matured as U. S. Patent No. 2,273,181, dated February 17, 1942, to DeGroote and Keiser. Said co-pending application contemplates resolution of petroleum emulsions of the water-in-oil type by means of demulsifiers of the following formula type:

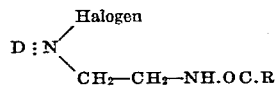

in which the acyl radical RCO is derived from a monocarboxy detergent-forming acid having at least 8 carbon atoms and not more than 32 carbon atoms; and D:N represents a heterocyclic compund of the pyridine series consisting of pyridine, quinoline, isoquinoline, and C-methyl homologues thereof. The halogen, of course, is most suitably chlorine or bromine; but iodine may be employed except for its excessive cost. More correctly, D:N is contemplated as a radical, rather than a compound.

Attention is also directed to our co-pending applications, filed the same date as the instant application, and bearing the following serial numbers: 415,763, 415,764 and 415,766.

Having thus described our invention, what we claim as new and desire to secure by Letters Patent is:

1. A process for breaking petroleum emulsions of the water-in-oil type, which consists in subjecting the emulsion to the action of a demulsifier comprising a chemical compound of the following formula:

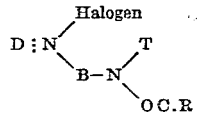

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals being not more than 22 carbon atoms; hydroxylated aliphatic ether radicals of the type B.OH, where B has its previous significance; and hydroxyethyl radicals; and R.CO denotes a radical derived from a detergent-forming monocarboxy acid having at least 8 and not more than 32 carbon atoms; and D:N represents a radical of a heterocyclic compound of the pyridine series consisting of pyridine, quinoline, isoquinoline, and C-linked methyl homologues thereof.

2. A process for breaking petroleum emulsions of the water-in-oil type, which consists in subjecting the emulsion to the action of a demulsifier comprising a chemical compound of the following formula:

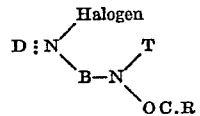

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; and R.CO denotes a radical derived from a higher fatty acid; and D:N represents a radical of a heteroyclic compound of the pyridine series consisting of pyridine, quinoline, isoquinoline, and C-linked methyl homologues thereof.

3. A process for breaking petroleum emulsions of the water-in-oil type, which consists in subjecting the emulsion to the action of a demulsifier comprising a chemical compound of the following formula:

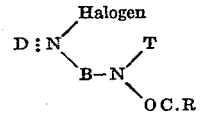

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; and R.CO denotes a radical derived from a higher unsaturated fatty acid; and D:N represents a radical of a heterocyclic compound of the pyridine series consisting of pyridine, quinoline, isoquinoline, and C-linked methyl homologues thereof.

4. A process for breaking petroleum emulsions of the water-in-oil type, which consists in subjecting the emulsion to the action of a demulsifier comprising a chemical compound of the following formula:

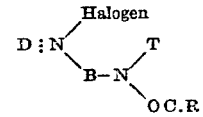

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; and R.CO denotes a ricinoleyl radical; and D:N represents a radical of a heterocyclic compound of the pyridine series consisting of pyridine, quinoline, isoquinoline, and C-linked methyl homologues thereof.

5. A process for breaking petroleum emulsions of the water-in-oil type, which consists in subjecting the emulsion to the action of a demulsifier comprising a chemical compound of the following formula:

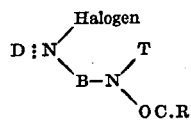

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; R.CO denotes an oleyl radical; and D:N represents a radical of a heterocyclic compound of the pyridine series consisting of pyridine, quinoline, isoquinoline, and C-linked methyl homologues thereof.

6. A process for breaking petroleum emulsions of the water-in-oil type, which consists in subjecting the emulsion to the action of a demulsifier comprising a chemical compound of the following formula:

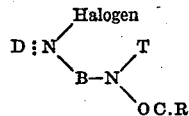

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; R.CO denotes a linoleyl radical; and D:N represents a radical of a heterocyclic compound of the pyridine series consisting of pyridine, quinoline, isoquinoline, and C-linked methyl homologues thereof.

MELVIN DE GROOTE.
BERNHARD KEISER.